(12) United States Patent
Barrow et al.

(10) Patent No.: US 6,715,319 B2
(45) Date of Patent: Apr. 6, 2004

(54) MELTING OF GLASS

(75) Inventors: Thomas Barrow, Glan Colwyn (GB); David Alan Bird, Ormskirk (GB)

(73) Assignee: Pilkington plc, St. Helens (GB)

( * ) Notice: Subject to any disclaimer, the term of this patent is extended or adjusted under 35 U.S.C. 154(b) by 0 days.

(21) Appl. No.: 09/815,665

(22) Filed: Mar. 23, 2001

(65) Prior Publication Data

US 2002/0134112 A1 Sep. 26, 2002

(51) Int. Cl.[7] ............................................. C03B 5/225
(52) U.S. Cl. ................... 65/134.9; 65/134.1; 65/134.4; 65/336; 65/337
(58) Field of Search ........................... 65/134.1, 134.4, 65/134.9

(56) References Cited

U.S. PATENT DOCUMENTS

| | | | | |
|---|---|---|---|---|
| 3,885,945 A | * | 5/1975 | Rees et al. .................. | 65/135.7 |
| 4,704,153 A | * | 11/1987 | Schwenninger ............ | 65/134.9 |
| 5,632,795 A | * | 5/1997 | Brown et al. ............... | 65/134.4 |
| 5,655,464 A | * | 8/1997 | Moreau et al. ............. | 65/134.1 |
| 5,975,886 A | * | 11/1999 | Philippe ...................... | 431/165 |
| 6,237,369 B1 | * | 5/2001 | LeBlanc et al. ............ | 65/134.1 |

* cited by examiner

*Primary Examiner*—James Derrington
(74) *Attorney, Agent, or Firm*—Marshall & Melhorn, LLC

(57) ABSTRACT

A method of producing flat glass in which foam which appears on the surface of molten glass melted using oxy-fuel burners is dispersed by directing a diffuse, luminescent flame onto the surface of the glass carrying the foam.

5 Claims, 2 Drawing Sheets

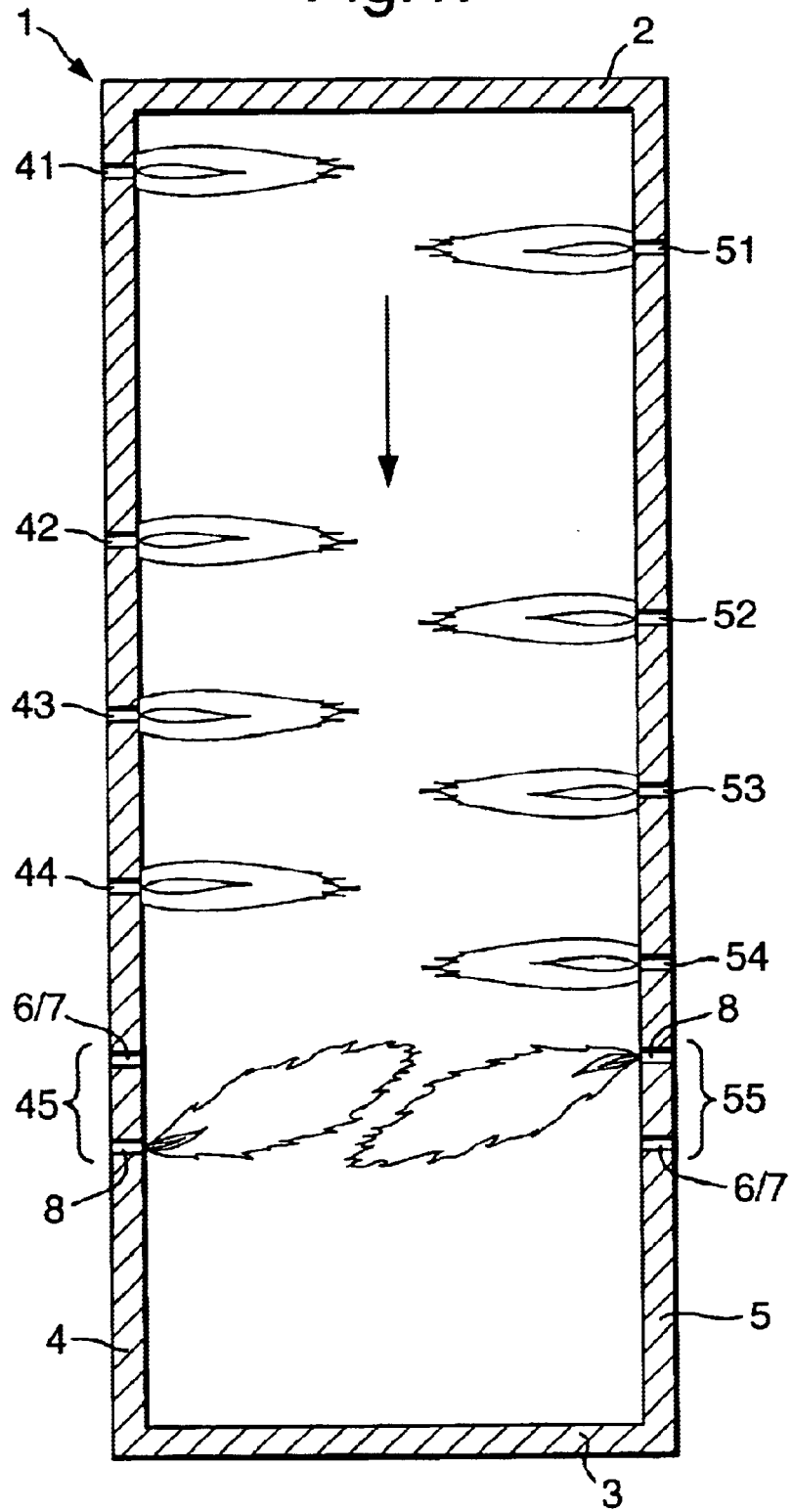

MELTING OF GLASS

BACKGROUND OF THE INVENTION

1. Field of the Invention

The present invention relates to a method of melting of glass for the production of flat glass, and to an apparatus for use in that method.

2. Description of the Prior Art

The batch constituents used for making glass are melted by means of burners which may be disposed in a variety of configurations. Probably the most common burner arrangement is one in which fossil fuel fired burners are disposed opposite one another along the length of a melting area of the furnace. For many years, the fuel has been combusted in air. More recently, however, so-called 'oxy-fuel' firing has been employed, primarily in container glass furnaces. In such a system the fuel is supplied together with oxygen (rather than air). In one particular arrangement that is known, the fuel and oxygen are supplied through co-axial conduits.

In oxy-fuel firing, the oxygen and the fuel are mixed as soon as they issue from their feed conduits into the furnace and, as a result, the oxygen-fuel mixture burns with an intense, concentrated, well-defined flame. Such a system has been primarily used in container glass furnaces, that is to say, furnaces used for melting glass for the production of shaped articles such as bottles, and is claimed to have number of advantages, including reduced energy requirements, reduced volume of waste gases and reduced capital costs.

Combustion of the fuel in oxygen as opposed to air results in an increase in the proportion of water (steam) in the furnace atmosphere, leading to the formation of a foam lying on the surface of the glass. An increase in the proportion of gas dissolved in the molten glass is also observed. These are not such serious problems in container glass furnaces, because the molten glass in such furnaces is extracted from the furnace from below the surface glass, and in any event, a significant proportion of bubble can generally be tolerated in container glasses. However, it is unacceptable in flat glass production, where the molten glass is drawn off from the surface of the melt and the acceptable bubble limits are usually about two orders of magnitude below those acceptable in container glass production.

SUMMARY OF THE INVENTION

We have now found that the problem can be overcome, to the extent of allowing flat including float glass of commercially acceptable quality to be produced using oxy-fuel melting, by directing a diffuse, luminescent flame on the surface of the molten glass, downstream of the oxy-fuel firing giving rise to the foam to be dissipated. Surprisingly, the use of this flame not only substantially destroys the foam, but leads to a reduction of the bubble within the glass to a level acceptable for float glass production.

According to the present invention there is provided a method of producing flat glass in which the glass batch is melted using burners fired by fuel and oxygen resulting in the formation of foam on the surface of the molten glass, and a burner downstream of such burners producing foam to be dispersed produces a flame which is diffuse, luminescent and impinges on the surface of the molten glass dispersing said foam.

By using such a flame, we are able to remove most if not all of the foam and reduce the bubbles in the resultant glass to commercially acceptable levels for general glazing or even automotive glazing. Use of the invention permits oxy-fuel firing to be used as the sole heat source in a flat glass furnace rather than, as at present, only for boost heating in combination with other firing techniques.

In conventional oxy-fuel burners, as used in container glass and glass fibre furnaces, the oxygen and fuel are introduced through co-axial or otherwise adjacent conduits and their mixing is almost instantaneous; a very turbulent gas mixture is formed which leads to almost instantaneous and substantially complete combustion with a clean (i.e. low luminosity), well-defined flame being produced. Similar burners may be used to melt the glass batch in oxy-fuel fired flat glass furnaces according to the invention, but result in the production of foam as described above. However, to achieve the diffuse, luminescent flame required by the present invention to disperse the foam resulting from such burners, we prefer to use ports for the fuel and oxygen which are spaced apart from each other such that delayed mixing of the fuel and oxygen occurs in a region remote from the ports, and takes place over a larger area. This leads to the production of flames which are considerably more diffuse and luminescent than conventional oxy-fuel flames and generally cooler; in fact, a flame dispersing the foam will generally be cooler than the surface of the molten glass it contacts. The flame impinges on the surface of the glass and destroys foam which has built up thereon. The exact mechanism by which the flame disperses the foam is not understood; it is possible that, because the flame is luminescent, it contains small particles of carbon which physically burst the foam.

According to a further aspect of the present invention, there is provided a flat glass making furnace including a melting zone into which glass-making batch components are fed and a plurality of firing zones including burners for melting the components, wherein at least one of the firing zones includes a first port through which a fuel is introduced into the furnace and a second port through which oxygen is introduced into the furnace, the first and second ports being spaced apart from one another such that mixing of the fuel and of the oxygen occurs in a region remote from the ports and the flame produced by the mixture of the fuel and the oxygen is diffuse, luminescent and impinges on the surface of the glass.

It is preferred that the fuel and oxygen ports extend parallel to one another. Alternatively or additionally, one or both ports may be directed downwardly at an angle to the horizontal.

It is customary in side-fired furnace for firing zones to be provided in pairs disposed on opposed sides of the furnace substantially opposite one another. In oxy-fuel furnaces used for container glass or glass fibre production, the zones in each pair are usually slightly staggered with respect to one another in the longitudinal direction of the furnace. In the case of the present invention, it is preferred if at least one pair of spaced-apart oxygen and fuel ports are provided on each side of the furnace.

If desired, more than one pair of oxygen and fuel ports providing diffuse, luminescent flames directed on to the glass may be provided on each side of the furnace. However, because the chief reason for the provision of such ports is to attack the foam, it is not particularly useful to have such burner arrangements in regions where the foam is not a problem. Accordingly, we do not envisage more than two pairs of such burner arrangements on each side of the furnace and, normally, only one pair (i.e. one burner each side) will be used. It is desirable if at least one such burner arrangement on each side of the furnace form either the final or penultimate firing zone. However, one or more additional firing burners or pair of firing burners may be provided downstream of any burners dispersing the foam provided such burner or burners do not give rise to unacceptable foam. Thus it is preferred if a pair of burners dispersing the foam form the penultimate firing zone such that the final firing zone can be used for control purposes. Preferably, the fuel is a fuel oil, optionally a light fuel oil of the diesel type, or natural gas. Desirably, the fuel and oxygen are caused to enter the furnace in flow streams which extend substantially parallel to one another. Alternatively or additionally, one or both flow streams are directed downwardly towards the surface of the glass at a slight angle to the horizontal.

BRIEF DESCRIPTION OF THE DRAWINGS

The invention is illustrated but not limited by the following description of preferred embodiments of the method and furnace according to the invention in which:

FIG. 1 is schematic plan view of a float glass furnace for oxy-fuel firing in accordance with the invention showing the location of the burners.

DETAILED DESCRIPTION OF PREFERRED EMBODIMENT

Figure 2A:
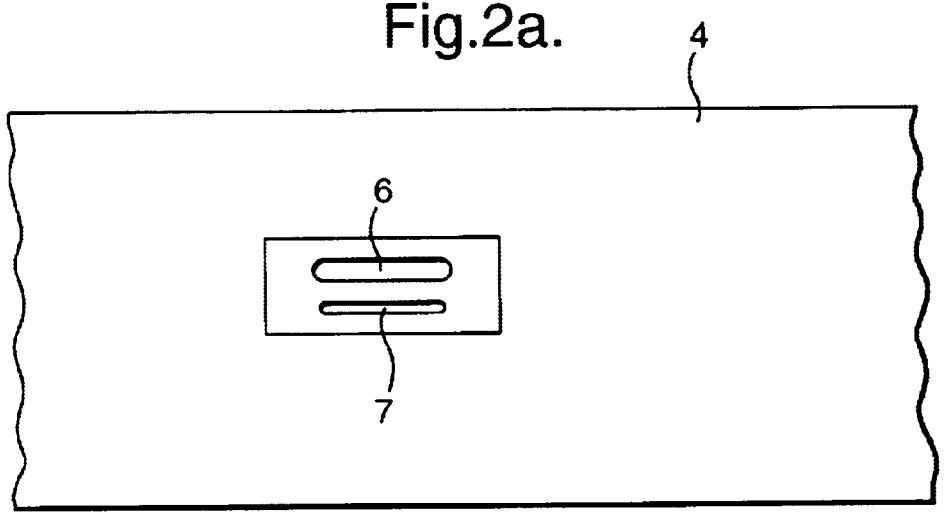
FIG. 2a is a schematic elevation of a conventional oxy-fuel burner in a side wall of a gloat glass furnace.

Referring to FIG. 1, a float glass melting furnace, which may be gas fired or oil fired, generally designated 1, has an upstream end 2 where the glass batch components for melting are fed in and a downstream end 3 from which the molten glass is fed through a float glass canal to a float bath where it is formed into a ribbon of glass. The ribbon cools as it progresses along the bath and, when it has cooled sufficiently, it is removed from the bath and passed through an annealing lehr to a warehouse end where it is cut into individual plates which are removed from the line and stored for distribution and use.

The furnace 1 has opposed side walls 4 and 5 each provided with exhaust ports (not shown) for waste gases, including combustion gases, towards the upstream end of the furnace.

A row of five spaced apart burners 41–45 and 51–55 is provided on each side of the furnace, the burners of one side of the furnace being staggered in relation to the burners on the other side of the furnace. The upstream burners 41–44 and 51–54 are all conventional oxy-fuel type as illustrated in FIG. 2a, with a port in the side wall for a fuel (e.g. natural gas) comprising a horizontal slot 6 immediately above a port for oxygen comprising a similar, but narrower, horizontal slot 7. The fuel and oxygen are conveyed to the slot through separate ducts terminating immediately behind the slots. The ducts may optionally, have fishtail openings at their ends. A mixture of fuel and oxygen is introduced through slot 6. The two slots 6, 7 are immediately adjacent and angled vertically towards each other so that the fuel/oxygen mixture and additional oxygen from slot 7 mix virtually instantaneously adjacent the chamber side wall and burn with a clean, well-defined flame. A foam forms on the surface of the molten glass and becomes increasingly dense as the melt progress downstream through the melting chamber.

Figure 2B:
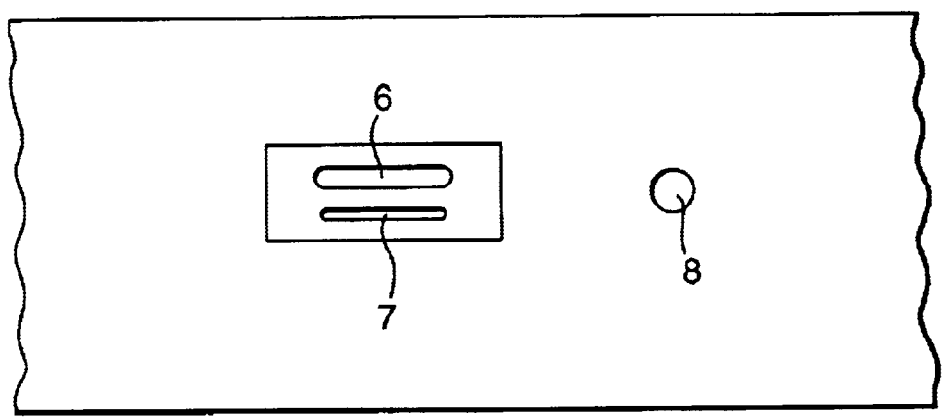
FIG. 2b is a schematic elevation of a burner arrangements for provision of a foam reducing fame in accordance with the invention in a side wall of a float glass furnace.

The last burner on each side of the furnace, 45, 55 is of modified form to achieve a less defined luminescent flame and, in each case, is of the form illustrated in FIG. 2b. In this case, oxygen only is introduced through both longitudinal slots 6 and 7, with the fuel introduced through a circular port 8 spaced longitudinally along the furnace wall form the slots. The fuel slots and oxygen port are angled down with the fuel slots preferably angled towards the oxygen ports, the fuel slot and oxygen port being about 70 cm apart. The fuel and oxygen streams mix increasingly with increasing distances from the furnace wall providing a luminous, ill defined flame which impinges on the surface of the molten glass dispersing the foam build up thereon. It is believed the flames disperse the foam as a result of either a physical chilling of the surface and/or a chemical interaction between the flame and the glass.

However, the applicants do not wish to restrict their invention to operation of any particular mechanism, and other mechanisms may apply e.g. bursting the foam by particulate carbon in the luminescent flame.

The effect of using a flame in accordance with the invention is to improve the quality of the resultant float glass to commercially acceptable standards. For example, when the burners used at 45 and 55 were substituted for conventional oxy-fuel burners (as used at 41 to 44 and 51 to 54 and illustrated in FIG. 2a) in the production of float glass of 4 mm thickness, the bubble density in the glass declined substantially, resulting in an increase in yield (to the desired commercial quality) from 50% to over 90%.

While the invention has been described, in the above embodiment, with reference to float glass production, it may also be used when melting glass for forming by other flat glass processes e.g. rolled plate or sheet glass process. However, acceptable bubble limits in sheet glass and especially rolled glass are generally higher than in float glass, and it is anticipated that the invention will be most useful when applied to the production of float glass.

What is claimed is:

1. A method of producing flat glass in which glass batch is melted in a furnace using burners fired by fuel and oxygen resulting in the formation of foam on the surface of the molten glass, and a burner, provided in a side-wall of the furnace, downstream of such burners producing foam produces a flame which is diffuse, luminescent and impinges on the surface of the glass dispersing said foam, said flame being cooler than the surface of the glass it contacts.

2. A method as claimed in claim 1 wherein the glass is melted using oxy-fuel burners supplying oxygen and fuel which mix on entry to the furnace to burn with concentrated well defined flames.

3. A method as claimed in claim 2 wherein the glass is melted using at least four pairs of opposed, optionally staggered oxy-fuel burners, and the resulting foam is dispersed using one or more diffuse luminescent flames in accordance with claim 1.

4. A method as claimed in claim 1 wherein a pair of opposed, optionally staggered, burners are used to provide two opposed, optionally staggered, diffuse luminescent flames which impinge on the surface of the glass to disperse the foam.

5. An improved method of producing flat glass wherein the glass is melted in a furnace and subsequently formed into a continuous ribbon wherein the improvement comprises melting the glass using burners fired by fuel and oxygen resulting in formation of foam on the surface of the molten glass and dispersing the foam by directing a diffuse, luminescent flame originating from a burner provided in a side-wall of the furnace onto the surface of the glass carrying the foam, said flame being cooler than the surface of the glass it contacts.

* * * * *